US006954631B2

(12) United States Patent
Thiebot

(10) Patent No.: US 6,954,631 B2
(45) Date of Patent: Oct. 11, 2005

(54) APPARATUS AND METHOD FOR TELECOMMUNICATIONS SERVICES

(75) Inventor: Christophe Thiebot, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 10/366,072

(22) Filed: Feb. 13, 2003

(65) Prior Publication Data

US 2004/0162054 A1 Aug. 19, 2004

(51) Int. Cl.[7] ........................ H04M 11/00; H04M 15/00
(52) U.S. Cl. ..................... 455/406; 455/408; 379/114.2
(58) Field of Search ................................ 455/406, 408, 455/414.1, 418, 422.1, 424, 560; 379/114.2, 114.28, 114.03

(56) References Cited

U.S. PATENT DOCUMENTS 5,732,127 A * 3/1998 Hayes ................... 379/114.28
5,873,030 A 2/1999 Mechling et al.
5,912,954 A 6/1999 Whited et al.
5,953,398 A * 9/1999 Hill ....................... 379/121.04
6,023,499 A * 2/2000 Mansey et al. ............. 379/111
6,047,051 A 4/2000 Ginzboorg et al.
6,263,060 B1 * 7/2001 MeLampy et al. ..... 379/114.15
6,317,490 B1 11/2001 Cameron et al.
6,335,968 B1 1/2002 Malik
6,366,655 B1 4/2002 Book et al.
6,463,275 B1 10/2002 Deakin
6,483,907 B1 11/2002 Wong et al.
6,636,593 B1 * 10/2003 MeLampy et al. ..... 379/114.15
6,760,417 B1 * 7/2004 Wallenius .............. 379/114.28
6,856,676 B1 * 2/2005 Pirot et al. ............. 379/201.01
2002/0176377 A1 * 11/2002 Hamilton .................... 370/328

* cited by examiner

*Primary Examiner*—Binh K. Tieu

(57) ABSTRACT

One embodiment disclosed relates to a modular apparatus for telecommunications services. The apparatus includes at least a network interface, a service logic program, and a plug-in module. The network interface exchanges signals with a telephony network, and the service logic program communicates control events with the telephony network by way of the network interface. The plug-in module is configured to exchange in real-time (i) a first type of messages with a charging server and (ii) a second type of messages with the service logic program.

22 Claims, 8 Drawing Sheets

FUNCTIONAL OVERVIEW

FUNCTIONAL OVERVIEW

BASIC MBI CALL FLOW

CALL REJECTION CALL FLOW

MBI MANAGEMENT CALL FLOW

MESSAGES INITIATED BY THE PPS

MBI ACCOUNT MANAGEMENT CALL FLOW

APPARATUS AND METHOD FOR TELECOMMUNICATIONS SERVICES

BACKGROUND OF THE INVENTION

1. Field of the Invention

The present invention relates generally to telecommunications systems.

2. Description of the Background Art

Conventionally, telephony service billing is conducted periodically. At the end of the billing period, the accumulated call data stored on telecommunications switches is downloaded to a facility that combines data for a subscriber and then compiles a summarized billing for the subscriber which is sent for payment.

With the conventional accounting structure, billing information is not readily accessible during a call. For example, a telecommunications service provider cannot readily access the billing information in real-time to determine when a prepaid caller has run out of credit.

A service control point is a central intelligent network node where service logic is executed. A previous implementation of a billing system for prepaid services has integrated a custom billing system into the service control point. However, such a solution is costly and lacks flexibility.

SUMMARY

One embodiment of the invention relates to a modular apparatus for telecommunications services. The apparatus includes at least a network interface, a service logic program, and a plug-in module. The network interface exchanges signals with a telephony network, and the service logic program communicates control events with the telephony network by way of the network interface. The plug-in module is configured to exchange in real-time (i) a first type of messages with a charging server and (ii) a second type of messages with the service logic program.

Another embodiment of the invention pertains to a method for telecommunications services. The method includes exchanging signals between a service logic program and a telephony network. The method also includes exchanging in real-time a first type of messages between a module and a charging server and exchanging in real-time a second type of messages between the module and the service logic program.

Another embodiment of the invention pertains to a scalable apparatus for telecommunications services. The apparatus includes a plurality of plug-in modules configured to exchange in real-time (i) a first type of messages with a charging server and (ii) a second type of messages with a service logic program. In accordance with this embodiment, links to the charging server are creatable and deletable by way of activating and deactivating the plug-in modules such that bandwidth to the charging server is scalable.

DETAILED DESCRIPTION

Figure 1:
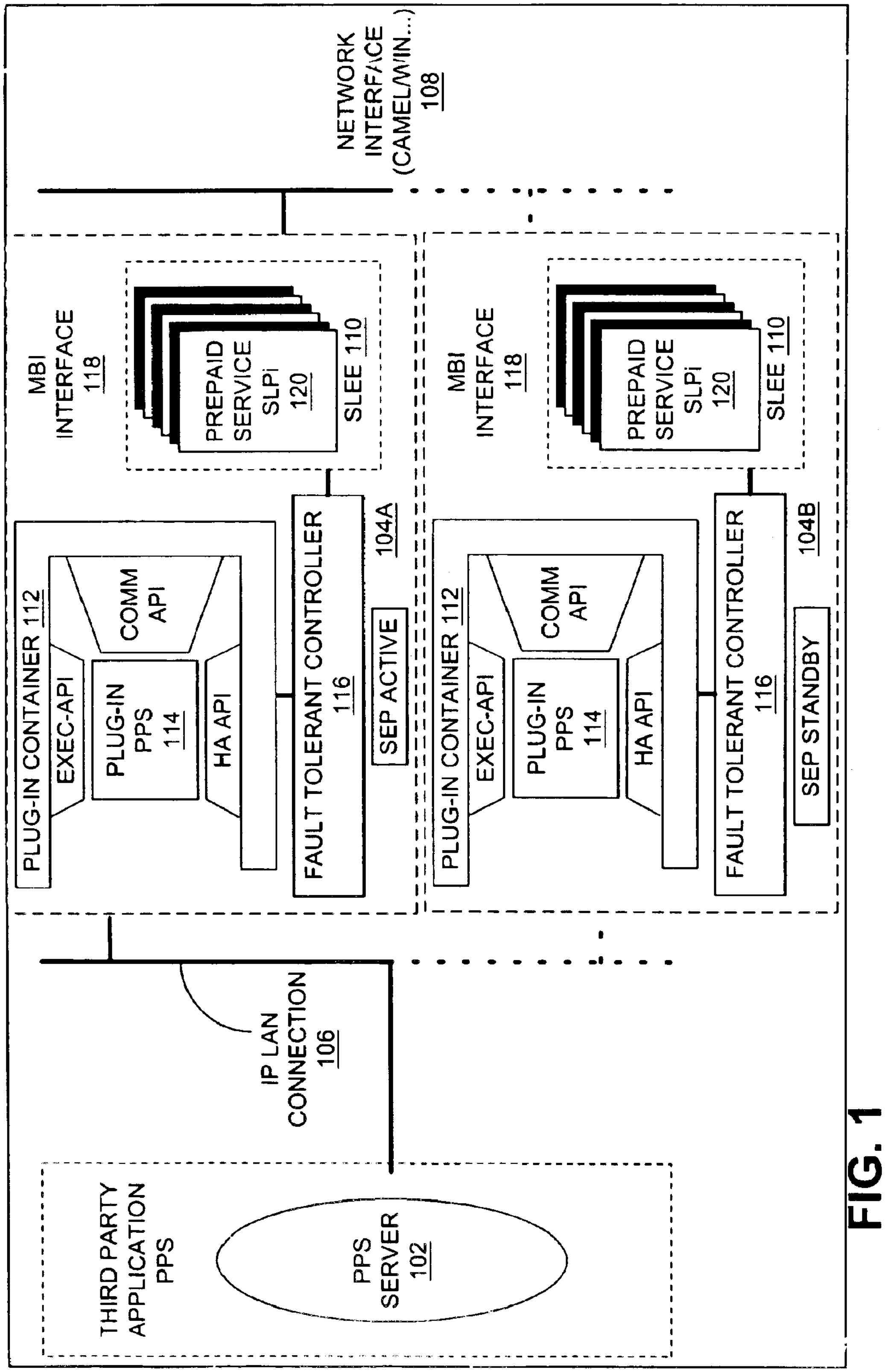
FIG. 1 depicts a high availability system for providing telecommunications services with real-time billing in accordance with an embodiment of the invention.

FIG. 1 depicts a high availability system for providing telecommunications services with real-time billing in accordance with an embodiment of the invention. The system includes a prepaid charging server (PPS server) 102, two service execution platform (SEP) systems 104*a* and 104*b*, a connection 106 between the PPS server and the SEP, and a network interface 108.

The PPS server 102 may comprise a billing application available from various third party vendors. The billing application may use a specific billing protocol that is specific to each vendor's billing system.

The connection 106 between the PPS server and the SEP systems 104*a* and 104*b* may comprise, for example, a local area network (LAN). The LAN may, for example, utilize the Internet protocol (IP) for communications between devices. Alternatively, the connection 106 may comprise a wide area network (WAN) if the PPS server 102 is located remotely from the SEP systems 104*a* and 104*b*.

The two SEP systems 104*a* and 104*b* are provided for purposes of redundancy in order to provide high availability. As illustrated, one SEP system 104*a* is active, while the other SEP system 104*b* is on standby. Each SEP system comprises a service logic execution environment (SLEE) 110, plug-in "container" software 112, a plug-in PPS module 114, and a fault tolerant controller 116. A message-based interface (MBI interface) 118 is utilized between the plug-in container software 112 and the SLEE 110.

One or more service logic programs (SLP) may be executed on the SLEE 110. An SLP is a program implementing a telecommunications-related service. SLPi denotes an instance of the SLP. In particular, a prepaid service SLP 120 may be executed on the SLEE 110. The call control logic is executed uniquely on the active SEP system 104*a*. If the standby SEP system becomes the active system, then the new calls control logic will run on that system.

The plug-in container 112 includes various application programming interfaces (API). For example, a communication (Comm) API may be used for interfacing between the Plug-In PPS module 114 and the SLEE 110. A high availability (HA) API is used for interfacing between the plug-in PPS module 114 and the fault tolerant controller 116.

The fault tolerant controller 116 is utilized to provide the redundancy needed for high availability services. The fault tolerant controller 116 in the active SEP system 104*a* is in communication with the fault tolerant controller 116 in the standby SEP system 104*b*. When a core process (such as the SLEE 110) from the active SEP system 104*a* goes down or is interrupted, a switch occurs such that the service is provided by the standby SEP system 104*b*. This advantageously provides redundancy for high availability.

The MBI interface 118 is utilized for communicating between the prepaid service SLP 120 and the plug-in PPS module 114. In accordance with an embodiment of the invention, the MBI interface 118 utilizes a protocol that is independent from the specific billing protocol that is utilized by the PPS server 102. This is advantageous in that the system may be easily modified to work with a different PPS server 102 having a different billing protocol. In order to work with the different billing protocol, only the plug-in PPS module 114 need be modified to be compatible with that billing protocol. Other components may remain the same since the MBI interface 118 is independent of the billing protocol.

Figure 2:
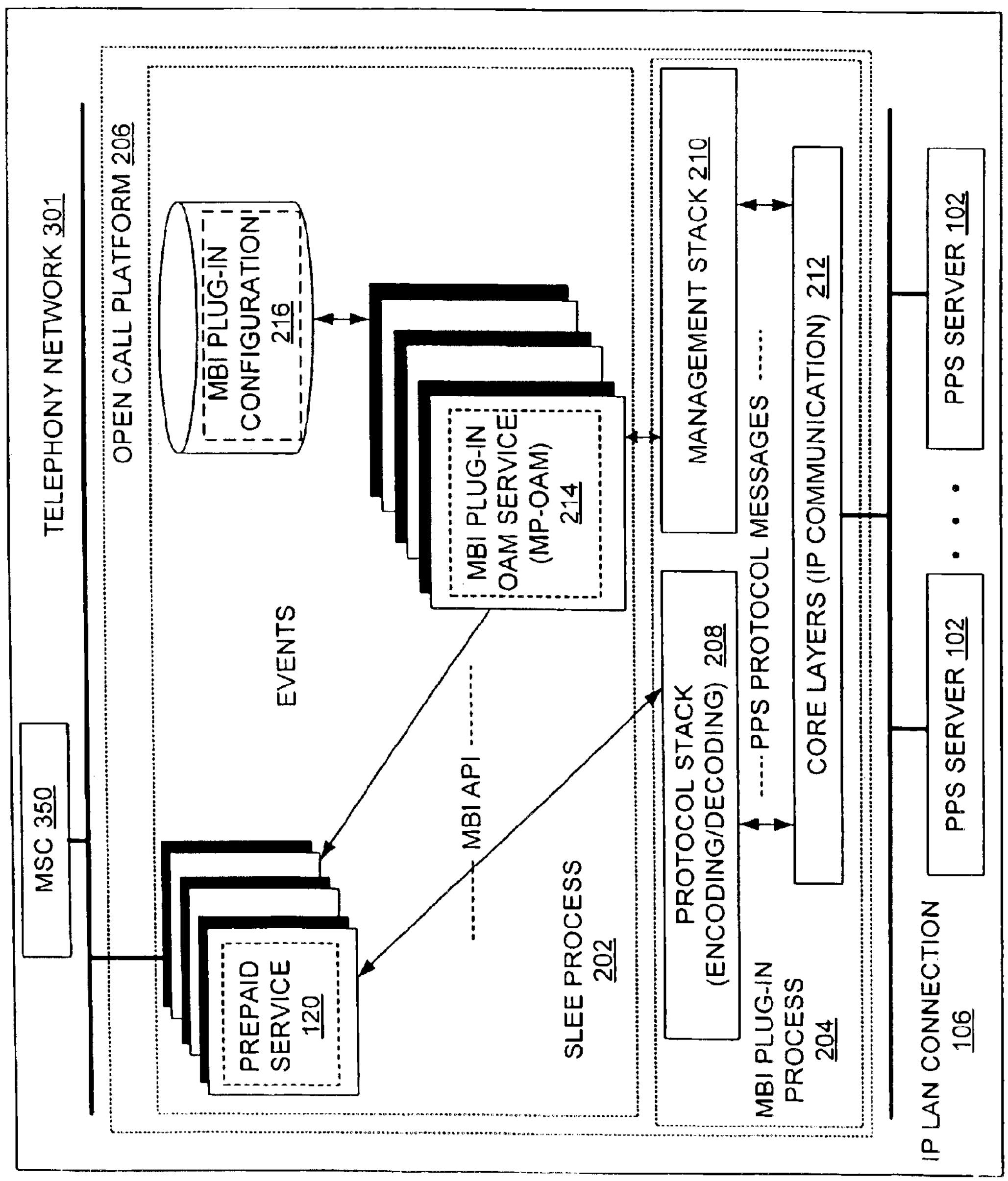
FIG. 2 gives a functional overview relating certain software processes in the system in accordance with an embodiment of the invention.

FIG. 2 gives a functional overview relating certain software processes in the system in accordance with an embodiment of the invention. The processes illustrated comprise a SLEE process 202 and an MBI plug-in process 204. Both these processes may run, for example, on an OpenCall platform 206 available from the Hewlett-Packard Company with offices in Cupertino, Calif. and other locations.

The SLEE process 202 includes one or more service logic programs, including the prepaid service SLP 120, and OAM (operations, administration, and maintenance) services, including an MBI plug-in OAM service 214. The MBI plug-in OAM service utilizes an MBI plug-in configuration database 216.

The MBI plug-in process 204 includes a protocol stack 208, a management stack 210, and core layers 212. The protocol stack 208 is a set of protocol layers in charge of protocol conversion functionalities. The management stack 210 is similarly in charge of the communications between the PPS server 102 and the MBI plug-in OAM service 214. The core layers 212 are in charge of the communications between the PPS server 102 and the prepaid service 120.

Figure 3:
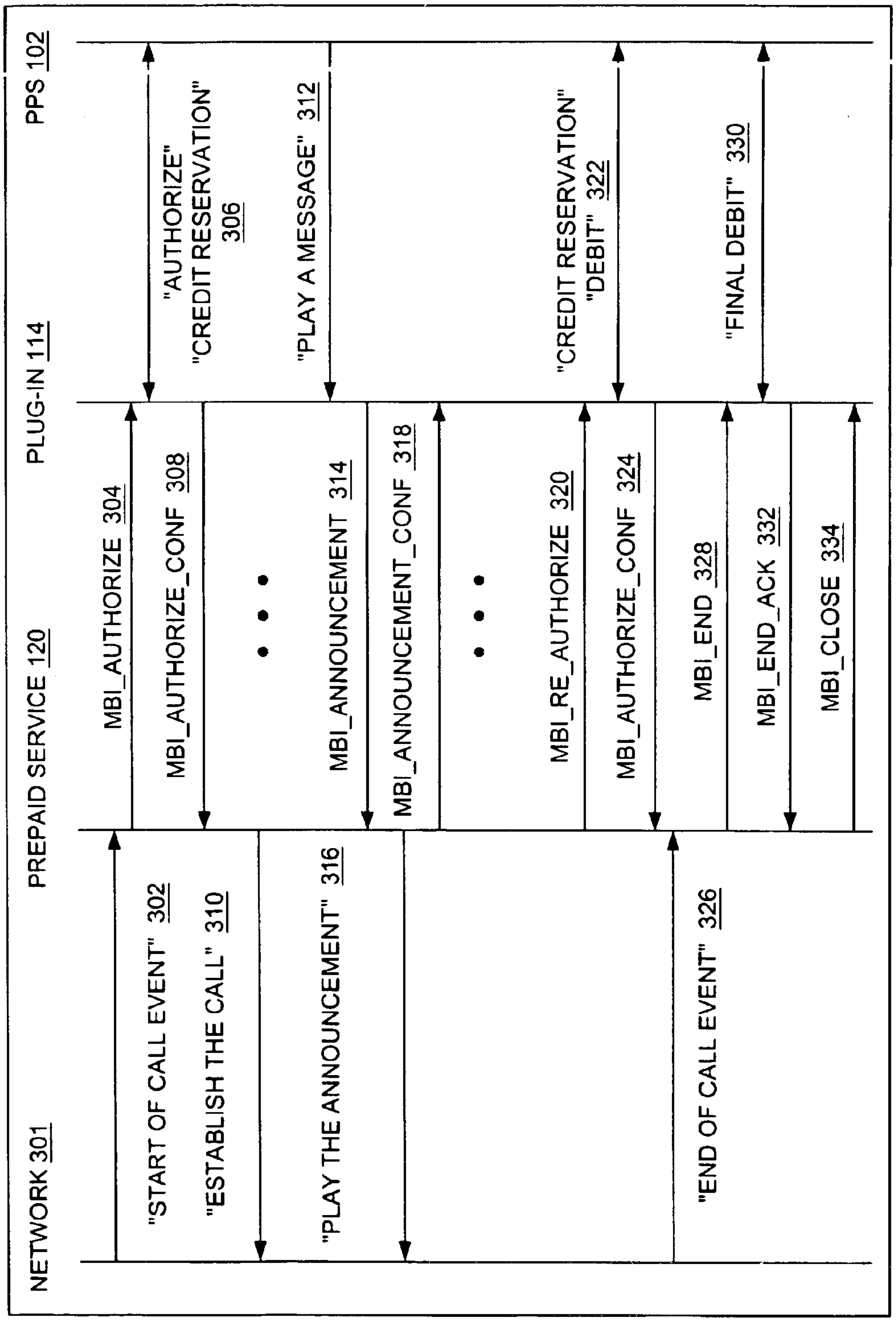
FIG. 3 depicts basic message-based interface (MBI) call flow in accordance with an embodiment of the invention.

FIG. 3 depicts basic message-based interface (MBI) call flow in accordance with an embodiment of the invention. The flow is illustrated between the telephony network 301, the Prepaid Service SLP 120, the Plug-In PPS module 114, and the PPS server 102.

First, the top of FIG. 3 shows a "start of call event" type message 302 from the telephony network 301 to the Prepaid Service SLP 120. In particular, such messages may be sent (and received) by a Mobile Switching Center (MSC) 350 in the telephony network 301. The specific form of the "start of call event" type message 302, and of other communications between the Prepaid Service SLP 120 and the telephony network 301, will depend on the telecommunications protocol of the telephony network 301. For example, under the CAMEL (Customized Application for Mobile network Enhanced Logic) protocol, the start of call event 302 may comprise an InitialDP message. As another example, under the Wireless Intelligent Network (WIN) protocol, the start of call event 302 may comprise an OriginationRequest.Invoke message. Other telecommunications protocols may be used, and embodiments of the present invention are intended to be adapted for use with various telecommunications protocols.

The Prepaid Service SLP 120 receives the start of call event 302. It responds by generating an MBI_authorize message and transmitting the message to the Plug-In PPS module 114. This MBI_authorize message is part of the MBI interface. In accordance with an embodiment of the invention, the messages of the MBI interface are independent of the billing protocol used for communications between the Plug-In PPS module 114 and the PPS server 102.

The Plug-In PPS module 114 receives the MBI_authorize message 304 and then communicates with the PPS server 102 regarding "authorization" and "credit reservation" 306 in relation to the call. For example, the communication may be in the form of the Plug-In module 114 sending a "Reserve Request" message with specified parameters to the PPS server 102, and the PPS server 102 responding with a "Reserve Response" message with specified parameters. The specific communication will depend on the billing protocol used by the PPS server 102. For example, the PPS server 102 may use the billing protocol for an Amdocs billing system, available from Amdocs Limited of Chesterfield, Mo. and other office locations. Other billing systems besides Amdocs may be used, and embodiments of the present invention are intended to be customizable to a variety of billing systems.

Upon receiving an affirmative authorization/credit reservation, the Plug-In PPS module 114 sends an MBI_authorize_confirmation message 308 to the Prepaid Service SLP 120. With the authorization confirmed, the Prepaid Service SLP 120 signals the telephony network 301 with an "establish the call" type message 310.

Second, FIG. 3 shows how the PPS server 102 may cause an announcement to be played to the user. The PPS server 102 does so by sending a "play a message" type message 312, including the announcement to be played, to the Plug-In PPS module 114. Upon receipt of that message, the Plug-In PPS module 114 sends an MBI_announcement 314 to the Prepaid Service SLP 120. The Prepaid Service SLP 120 responds by transmitting a "play the announcement" type message 316 to the telephony network 301. The Prepaid Service SLP 120 also responds by sending an MBI_announcement_confirmation message 318 back to the Plug-In PPS module 114.

Third, FIG. 3 shows how the Prepaid Service SLP 120 may re-authorize a call. The Prepaid Service SLP 120 does so by sending an MBI_reauthorize message 320 to the Plug-In PPS module 114 when the time allocated by the PPS server 102 in the precedent authorization has expired. The timer used to determine such an expiration may be controlled by the Prepaid Service SLP 120 or a network switch. Typically, the PPS server 102 allocates time chunks to a user (not the full credit), so a user may have to be re-authorized a number of times during a call. Upon receipt of the MBI_reauthorize message 320, the Plug-In PPS module 114 communicates with the PPS server 102 regarding "credit reservation" and "debit" 306 in relation to the call event. For example, the communication may be in the form of the Plug-In module 114 sending a "Reserve Request" message with specified parameters to the PPS server 102, and the PPS server 102 responding with a "Reserve Response" message with specified parameters. The specific communication will depend on the billing protocol used by the PPS server 102. Upon receiving an affirmative response, the plug-in 114 sends an MBI_authorize_confirmation message 324 to the Prepaid Service SLP 120. This confirms the re-authorization of the call.

Fourth, near the bottom of FIG. 3 is shown the exchange for terminating the call event. The "end of call event" type message 326 is received from the telephony network 301 by the Prepaid Service SLP 120. For example, under the CAMEL protocol, the "end of call event" 326 may comprise the report of a disconnect event. As another example, under the WIN protocol, the "end of call event" 326 may comprise an ODisconnect.Invoke message.

The Prepaid Service SLP 120 receives the end of call event 326. It responds by generating an MBI_end message and transmitting the message to the Plug-In PPS module 114. Again, this MBI_end message 328 is part of the MBI interface.

The Plug-In PPS module 114 receives the MBI_end message 328 and then communicates with the PPS server 102 regarding "final debit" 330 in relation to the call. For example, the communication may be in the form of the Plug-In module 114 sending a "Charge Request" message with specified parameters to the PPS server 102, and the PPS server 102 responding with a "Charge Response" message with specified parameters. Again, the specific communication will depend on the billing protocol used by the PPS server 102.

Upon receiving a final debit related notification, the Plug-In PPS module 114 sends an MBI_end_acknowledgement message 332 to the Prepaid Service SLP 120. Finally, the Prepaid Service SLP 120 may send an MBI_close message 334 to the Plug-In PPS module 114 to clean the plug-in session allocated in the Plug-In PPS module 114.

Figure 4:
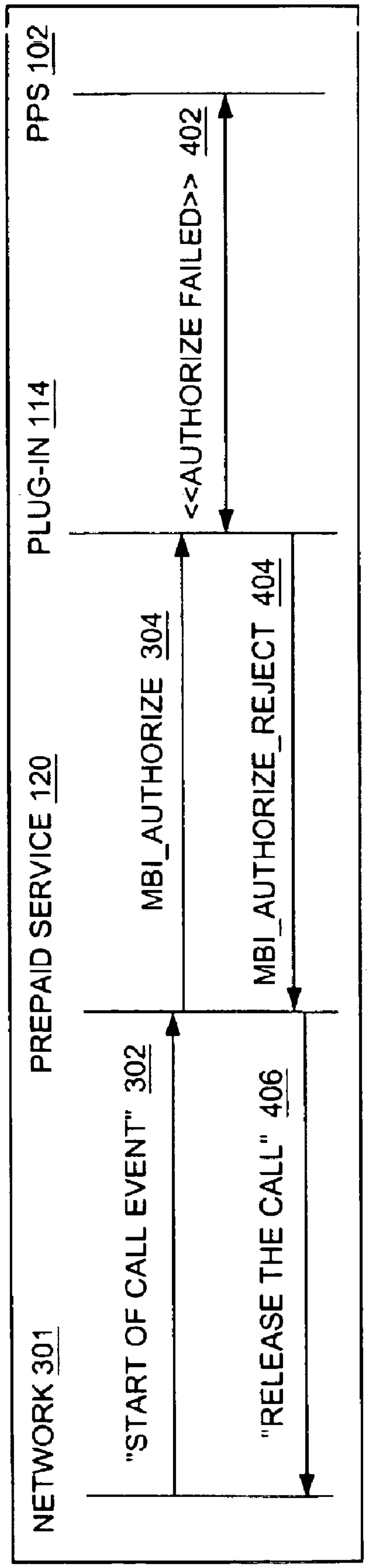
FIG. 4 depicts call flow for a call rejection in accordance with an embodiment of the invention.

FIG. 4 depicts call flow for a call rejection in accordance with an embodiment of the invention. The call flow begins with a "start of call event" type message 302 from the telephony network 301 to the Prepaid Service SLP 120. The Prepaid Service SLP 120 receives the "start of call event" 302. It responds by generating an MBI_authorize message and transmitting the message to the Plug-In PPS module 114. The Plug-In PPS module 114 receives the MBI_authorize message 304 and then communicates with the PPS server 102 regarding "authorization" in relation to the call. However, in this instance, the authorization fails 402. Upon receiving negative response regarding authorization, the Plug-In PPS module 114 sends an MBI_authorize_reject message 404 to the Prepaid Service SLP 120. With the authorization rejected, the Prepaid Service SLP 120 signals the telephony network 301 with a "release the call" type message 406.

Figure 5:
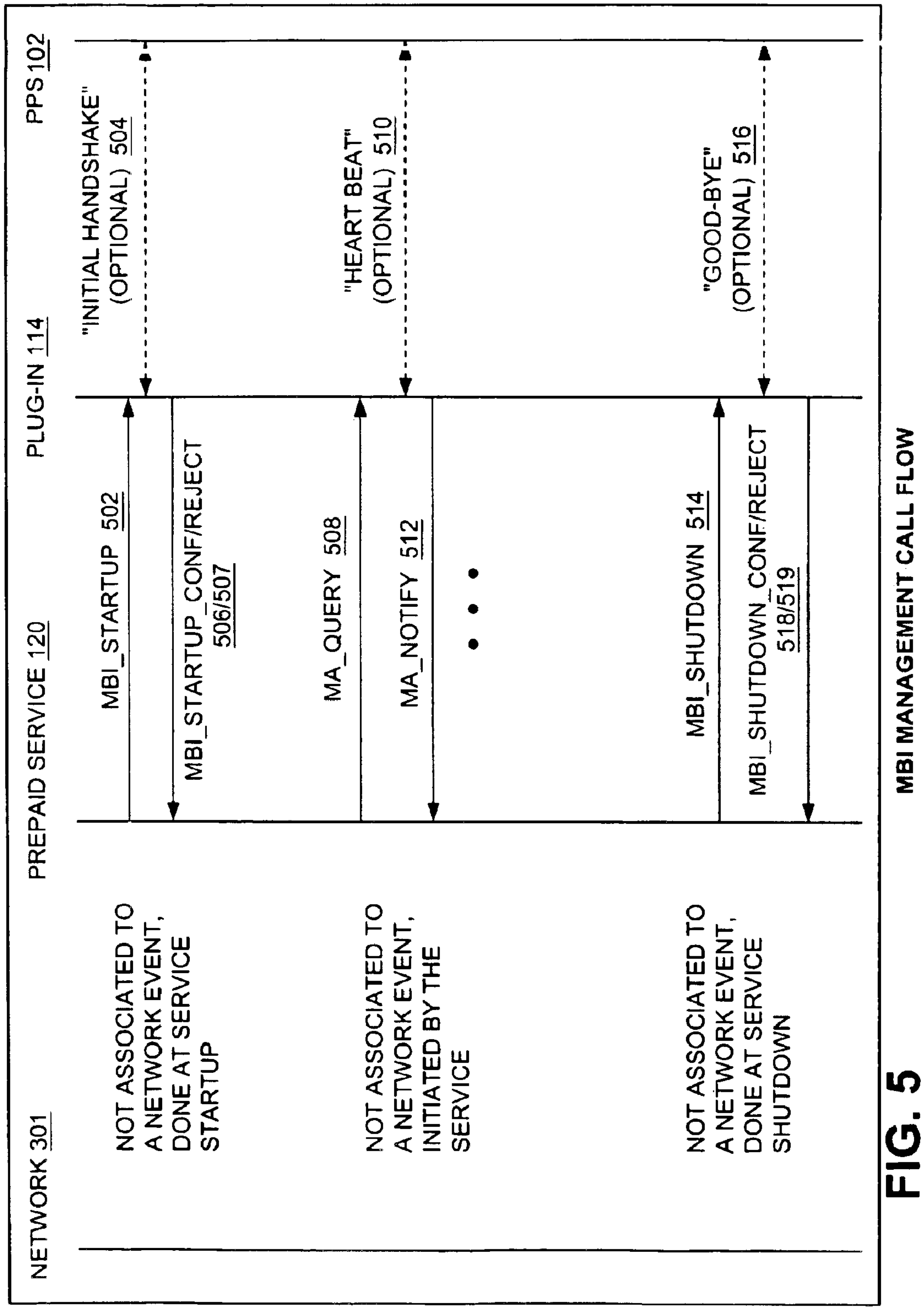
FIG. 5 depicts message flow for MBI management in accordance with an embodiment of the invention.

FIG. 5 depicts message flow for MBI management in accordance with an embodiment of the invention. These call flows are not associated with telephony network events. Rather, they are related to service management.

First, the top of FIG. 5 shows the message flow done at service startup. At service startup, the Prepaid Service SLP 120 transmits an MBI_startup message 502 to the Plug-In PPS module 114. An initial handshake communication 504 may then occur between the Plug-In PPS module 114 and the PPS server 102. Such a handshake 504 is optional, depending on the implementation. If the startup is successful, an MBI_startup_confirmation message 506 is sent from the Plug-In PPS module 114 to the Prepaid Service SLP 120. If the startup is unsuccessful, an MBI_startup_rejection message 507 is sent from the Plug-In PPS module 114 to the Prepaid Service SLP 120.

Second, the middle of FIG. 5 shows another message flow initiated by the service. The Prepaid Service SLP 120 transmits a management query (MA_query) 508 to the Plug-In PPS module 114. Such a management query 508 may be used by the Prepaid Service SLP 120 as a "heartbeat" mechanism to check that the connection with the PPS server 102 is still valid. A "heartbeat" communication 510 may then occur between the Plug-In PPS module 114 and the PPS server 102. Such a heart beat communication 510 is optional, depending on the implementation. Subsequently, an MA_Notify message 512 is sent from the Plug-In PPS module 114 to the Prepaid Service SLP 120.

Third, the bottom of FIG. 5 shows the message flow done at service shutdown. At service shutdown, the Prepaid Service SLP 120 transmits an MBI_shutdown message 514 to the Plug-In PPS module 114. A "good-bye" communication 516 may then occur between the Plug-In PPS module 114 and the PPS server 102. Such a good-bye communication 516 is optional, depending on the implementation. If the shutdown is successful, an MBI_shutdown_confirmation message 518 is sent from the Plug-In PPS module 114 to the Prepaid Service SLP 120. If the shutdown is unsuccessful, an MBI_shutdown_rejection message 519 is sent from the Plug-In PPS module 114 to the Prepaid Service SLP 120.

Figure 6:
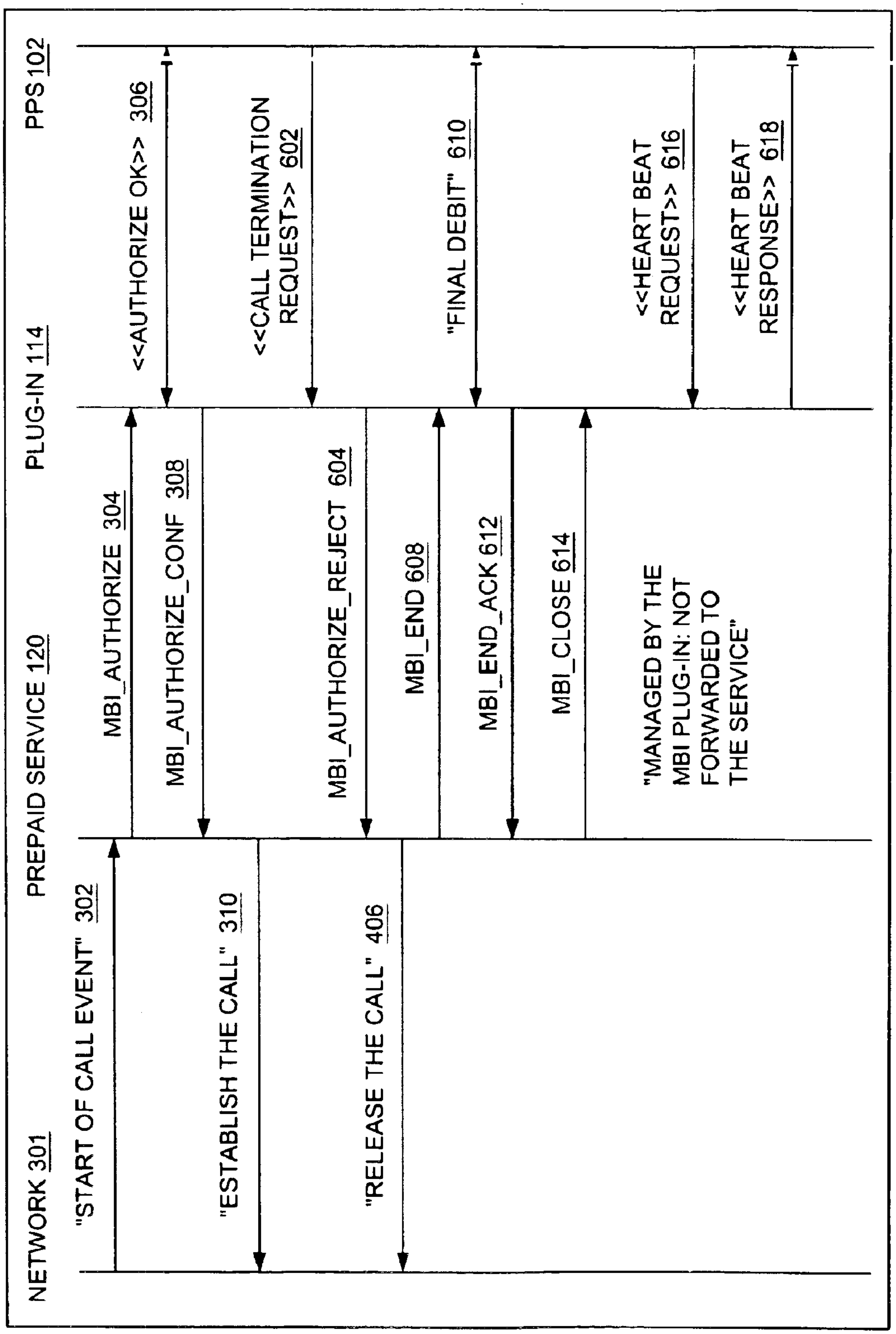
FIG. 6 depicts call flow including messages initiated by a prepaid charging server (PPS server) in accordance with an embodiment of the invention.

FIG. 6 depicts call flow including messages initiated by the PPS server 102 in accordance with an embodiment of the invention. The call flow (302, 304, 306, 308, and 310) at the top of FIG. 6 relates to authorization at the start of a call. This was described above in relation to FIG. 3.

Subsequently, during a call, the PPS server 102 may initiate a message flow by sending a call termination request 602. The Plug-In PPS module 114 receives the call termination request 602 and responds by transmitting an MBI_authorization_rejection message 604 to the Prepaid Service SLP 120. The Prepaid Service SLP 120 receives the MBI_authorization_rejection message 604. In response, the Prepaid Service SLP 120 sends a "release the call" message 406 to the telephony network, and the Prepaid Service SLP 120 also sends an MBI_end message 608 back to the Plug-In PPS module 114. A "final debit" type communication 610 then occurs between the Plug-In PPS module 114 and the PPS server 102. Subsequently, the Plug-In PPS module 114 may send an MBI_end_acknowledge message 612 to the Prepaid Service SLP 120, and the Prepaid Service SLP 120 may respond with an MBI_close message 614.

The PPS server 102 may also submit a heart beat type request 616 to the Plug-In PPS module 114. The heart beat type request 616 may be handled by the Plug-In PPS module 114 without forwarding to the Prepaid Service SLP 120. The Plug-In PPS module 114 transmits a heart beat type response 618 back to the PPS server 102.

Figure 7:
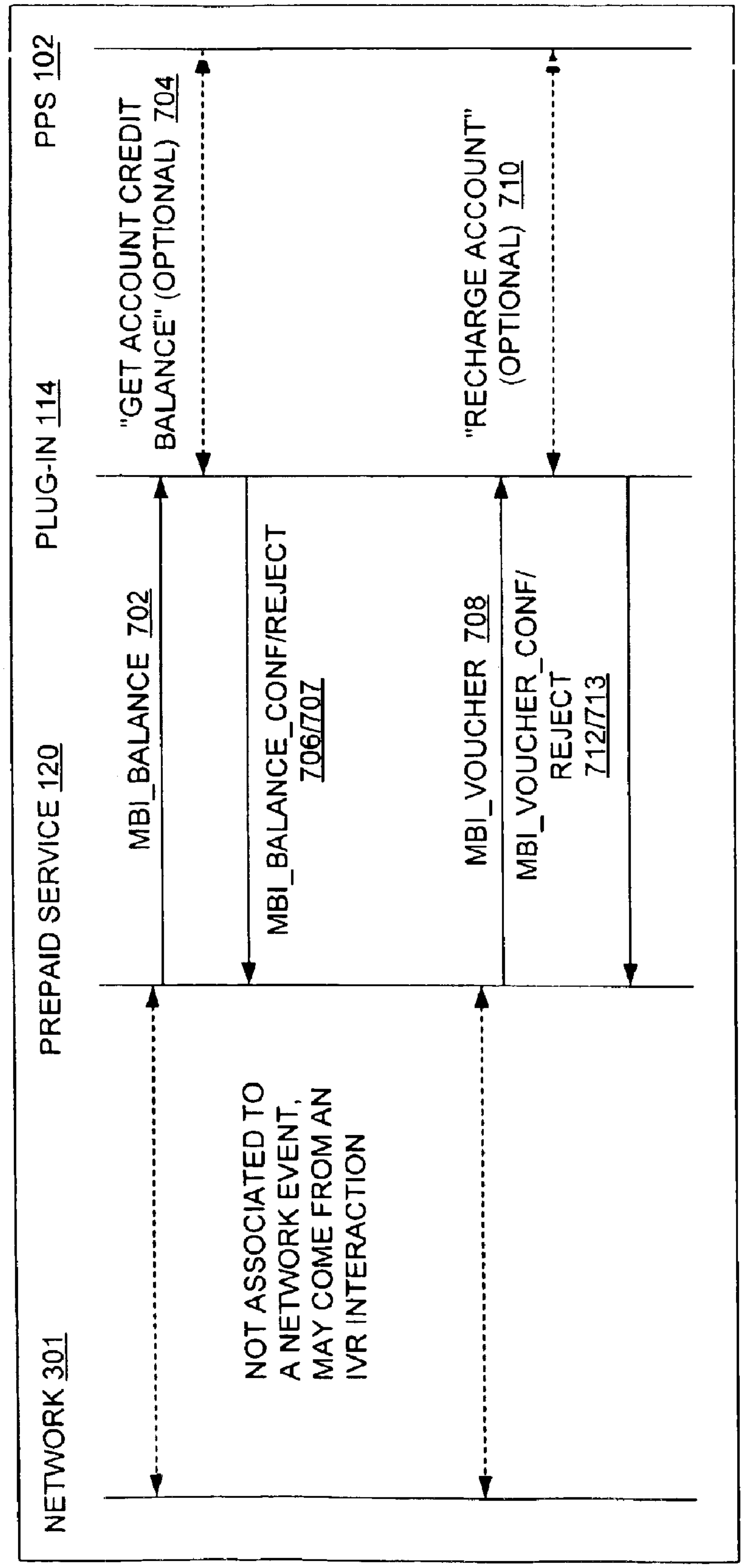
FIG. 7 depicts message flow for MBI account management in accordance with an embodiment of the invention.

FIG. 7 depicts message flow for MBI account management in accordance with an embodiment of the invention. The top of FIG. 7 shows the message flow in relation to a balance request. Such a request may not be associated with a telephony network event 301 per se, but it may originate from an Interactive Voice Response (IVR) interaction. The Prepaid Service SLP 120 sends an MBI_balance message 702 to the Plug-In PPS module 114. A "get account credit balance" type communication 704 then occurs between the Plug-In PPS module 114 and the PPS server 102. Subsequently, the Plug-In PPS module 114 may send an MBI_balance_confirmation 706 or rejection 707 message to the Prepaid Service SLP 120.

The top of FIG. 7 shows the message flow in relation to a voucher to recharge an account. The Prepaid Service SLP 120 sends an MBI_voucher message 708 to the Plug-In PPS module 114. A "recharge account" type communication 710 then occurs between the Plug-In PPS module 114 and the PPS server 102. Subsequently, the Plug-In PPS module 114 may send an MBI_voucher_confirmation 712 or rejection 713 message to the Prepaid Service SLP 120.

Figure 8:
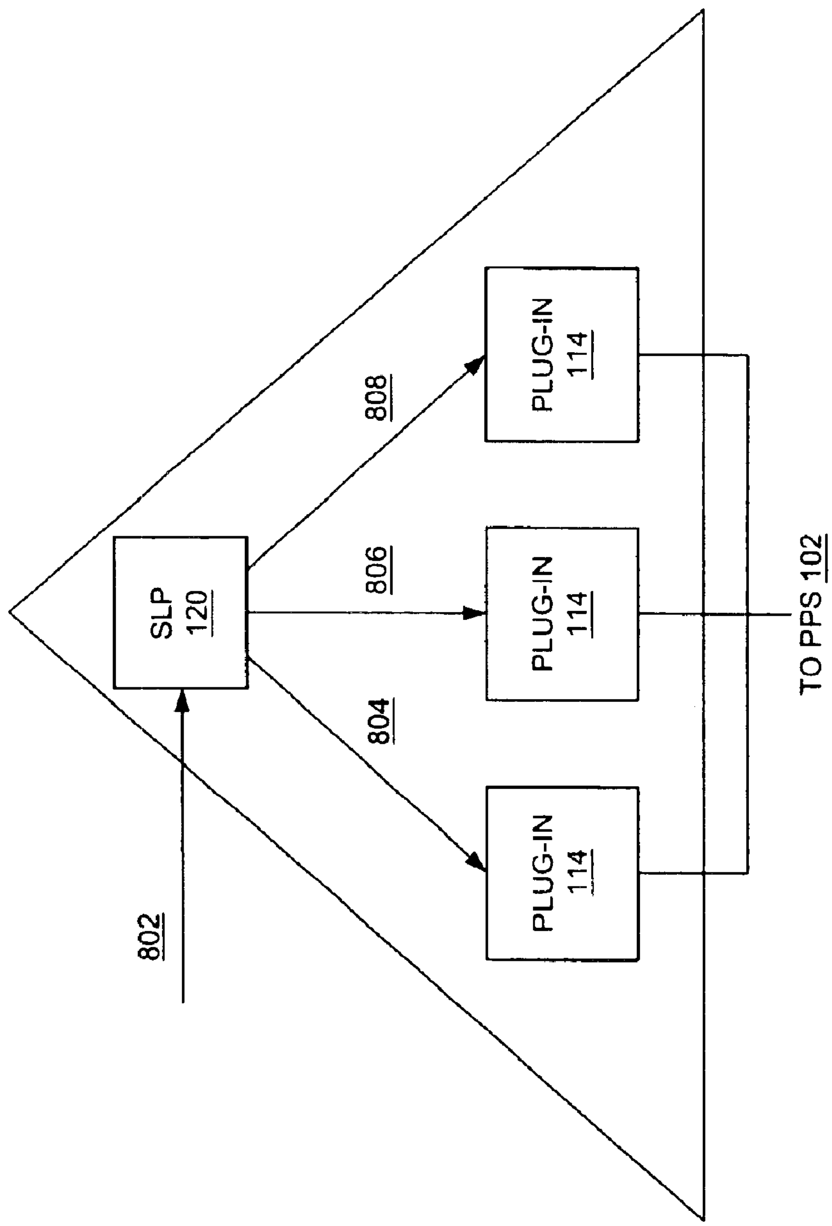
FIG. 8 depicts scalability of an apparatus in accordance with an embodiment of the invention.

FIG. 8 depicts scalability of an apparatus in accordance with an embodiment of the invention. The figure illustrates multiple links (802, 804, and 806) between an SLP 120 and a PPS server 102. Of course, while three links are illustrated, less than or more than three links may be utilized. Each link has a corresponding Plug-In PPS module 114. The SLP 120 may receive a command or instruction 802 to create an additional link if greater bandwidth to the PPS server 102 is needed. Similarly, the SLP 120 may receive a command or instruction 802 to delete a link if less bandwidth to the PPS server 102 is needed. The capability to create/delete links as necessary makes the apparatus advantageously scalable.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A modular apparatus for telecommunications services, the apparatus comprising:

(a) a network interface for exchanging signals with a telephony network;

(b) a service logic program configured to communicate control events with the telephony network by way of the network interface; and (c) a plug-in module configured to exchange in real-time (i) a first type of messages with a charging server under a specific billing protocol which is particular to the charging server and (ii) a second type of messages with the service logic program under a message-based interface (MBI) call authorization protocol which is independent of the specific billing protocol.

2. The apparatus of claim 1, wherein the service logic program comprises a prepaid service logic program, and the charging server comprises a prepaid charging server.

3. The apparatus of claim 1, further comprising:

(d) a fault tolerant controller coupled to the service logic program and to the plug-in module.

4. The apparatus of claim 1, wherein the plug-in module comprises a protocol stack for encoding and decoding communications with the service logic program and comprises core layers for communications with the charging server.

5. The apparatus of claim 4, wherein the plug-in module further comprises a management stack for communications with an OAM (operations, administration, and management) service that sends events to the service logic program.

6. A high-availability apparatus for telecommunications services, the apparatus comprising:

(a) a first network interface for exchanging signals with a telephony network;

(b) a first service logic program configured to communicate control events with the telephony network by way of the first network interface;

(c) a first plug-in module configured to exchange in real-time (i) a first type of messages with a charging server and (ii) a second type of messages with the first service logic program;

(d) a first fault tolerant controller coupled to the first service logic program and to the first plug-in module;

(e) a second network interface for exchanging signals with the telephony network;

(f) a second service logic program configured to communicate control events with the telephony network by way of the second network interface;

(g) a second plug-in module configured to exchange in real-time (i) the first type of messages with the charging server and (ii) the second type of messages with the second service logic program; and (h) a second fault tolerant controller coupled to the second service logic program and the second plug-in module, wherein a first service execution platform comprises the first network interface, the first service logic program, the first plug-in module, and the first fault tolerant controller, wherein a second service execution platform comprises the second network interface, the second service logic program, the second plug-in module, and the second fault tolerant controller, and wherein the first and second fault tolerant controllers are in communication such that the first and second service execution platforms may be individually activated to provide redundancy.

7. A method for telecommunications services, the method comprising:

exchanging signals between a service logic program and a telephony network;

exchanging in real-time a first type of messages between a module and a charging server under a specific billing Protocol that is particular to the charging server; and exchanging in real-time a second type of messages between the module and the service logic program under a message-based interface (MBI) call authorization protocol that is independent of the specific billing protocol.

8. The method of claim 7, wherein the service logic program comprises a prepaid service logic program, and the charging server comprises a prepaid charging server.

9. The method of claim 7, further comprising:

sending an MBI authorize message from the service logic program to the module in response to the service logic program receiving a start of call event from the telephony network;

returning an MBI authorize confirm message from the module to the service logic program and upon the module receiving affirmative authorization from the charging server; and returning an MBI authorize reject message from the module to the service logic program upon the module receiving a negative authorization response from the charging server.

10. The method of claim 7, further comprising:

sending an MBI announcement message from the module to the service logic program upon receipt of a play a message command from the charging server; and returning an MBI announcement confirm message from the service logic program once the announcement is relayed to the telephony network.

11. The method of claim 7, further comprising:

sending an MBI re-authorize message from the service logic program to the module; and returning an MBI authorize confirm message from the module to the service logic program upon the module successfully completing credit reservation with the charging server.

12. The method of claim 7, further comprising:

sending an MBI end message from the service logic program to the module upon receipt of an end of call event from the telephony network; and returning an MBI end acknowledge message from the module to the service logic program after final debit communications between the module and the charging server.

13. The method of claim 7, further comprising:

sending an MBI startup message from the service logic program to the module upon service startup;

returning an MBI startup confirm message from the module to the service logic program upon a successful handshake between the module and the charging server; and returning an MBI startup reject message from the module to the service logic program upon an unsuccessful handshake between the module and the charging server.

14. The method of claim 7, further comprising:

sending an MA query message from the from the service logic program to the module; and returning an MA notify message from the module to the service logic program.

15. The method of claim 7, further comprising:

sending an MBI shutdown message from the service logic program to the module at service shutdown;

returning an MBI shutdown confirm message from the module to the service logic program upon a successful "good-bye" type exchange between the module and the charging server; and returning an MBI shutdown reject message from the module to the service logic program upon an unsuccessful "good-bye" type exchange between the module and the charging server.

16. The method of claim 7, further comprising:

sending an MBI authorize reject message from the module to the service logic program upon receiving a call termination request from the charging server;

transmitting a release call event from service logic program to the telephony network; and returning an MBE end message from the service logic program to the module.

17. The method of claim 7, further comprising:

sending en MBI end acknowledge message from the module to the service logic program after a final debit is processed with the charging server.

18. The method of claim 7, further comprising:

receiving a heart beat request by the module from the charging server; and returning a heart beat response from the module to the charging server.

19. The method of claim 7, further comprising:

sending an MBI balance message from the service logic program to the module; and returning an MBI balance confirm message from the module to the service logic program upon the module receiving an affirmative message from the charging server pertaining to account credit balance.

20. The method of claim 7, further comprising:

sending an MBI voucher message from the service logic program to the module; and returning an MBI voucher confirm message from the module to the service logic program upon the module receiving an affirmative message from the charging server pertaining to account recharging.

21. A system for telecommunications services, the system comprising:

means for exchanging signals between a service logic program and a telephony network;

means for exchanging in real-time a first type of messages between a module and a charging server under a specific billing protocol that is particular to the charging server; and means for exchanging in real-time a second type of messages between the module and the service logic program under a real-time call authorization protocol that is independent of the specific billing protocol.

22. A scalable apparatus for telecommunications services, the apparatus comprising:

a service logic program configured to communicate control events with a telephony network by way of a network interface; and a plurality of plug-in modules configured to exchange in real-time (i) a first type of messages with a charging server under a specific billing protocol that is particular to the charging server and (ii) a second type of messages with the service logic program under a real-time call authorization protocol that is independent of the specific billing protocol, wherein links to the charging server are creatable and deletable by way of activating and deactivating the plug-in modules such that bandwidth to the charging server is scalable.

* * * * *